Patented Mar. 27, 1951

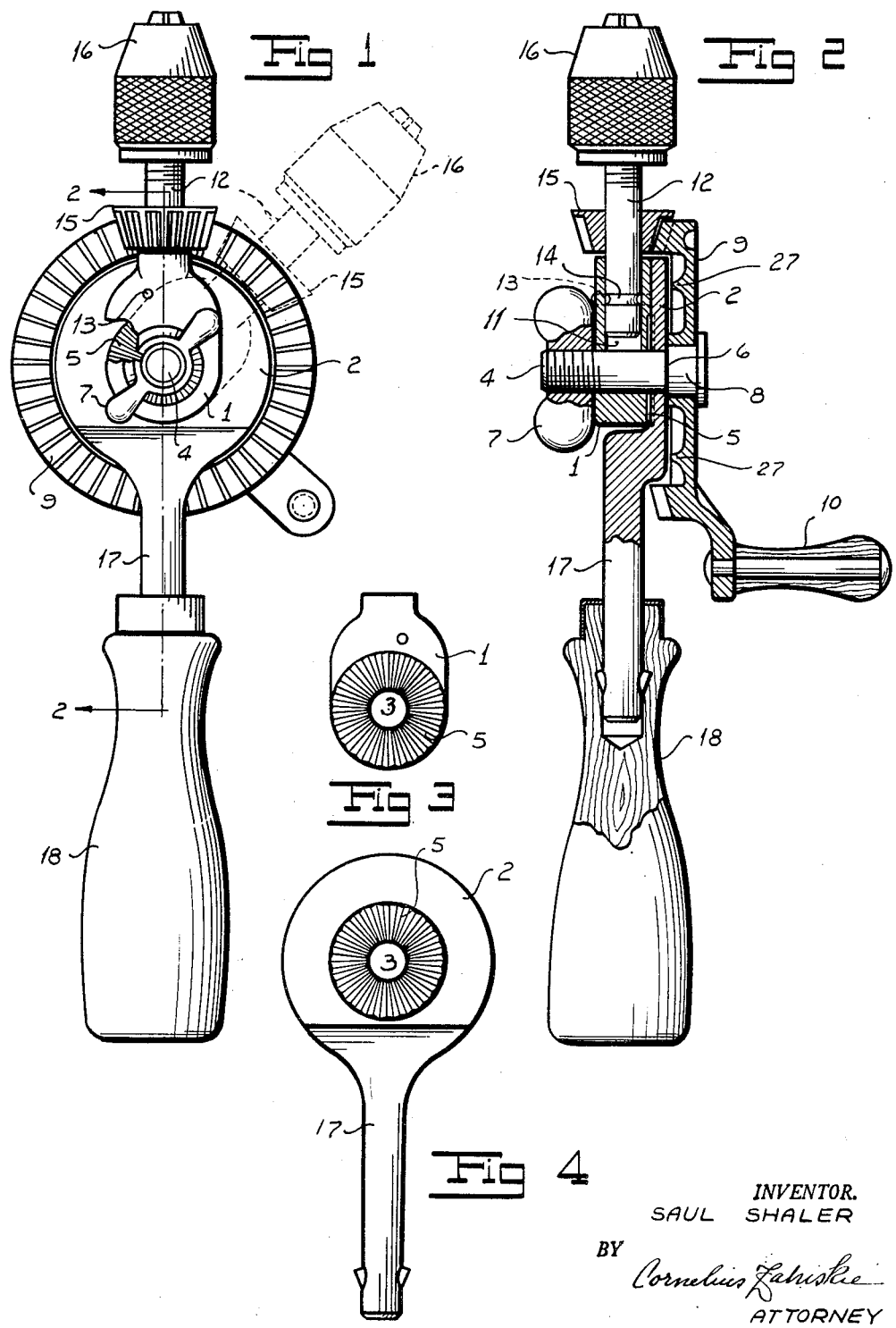

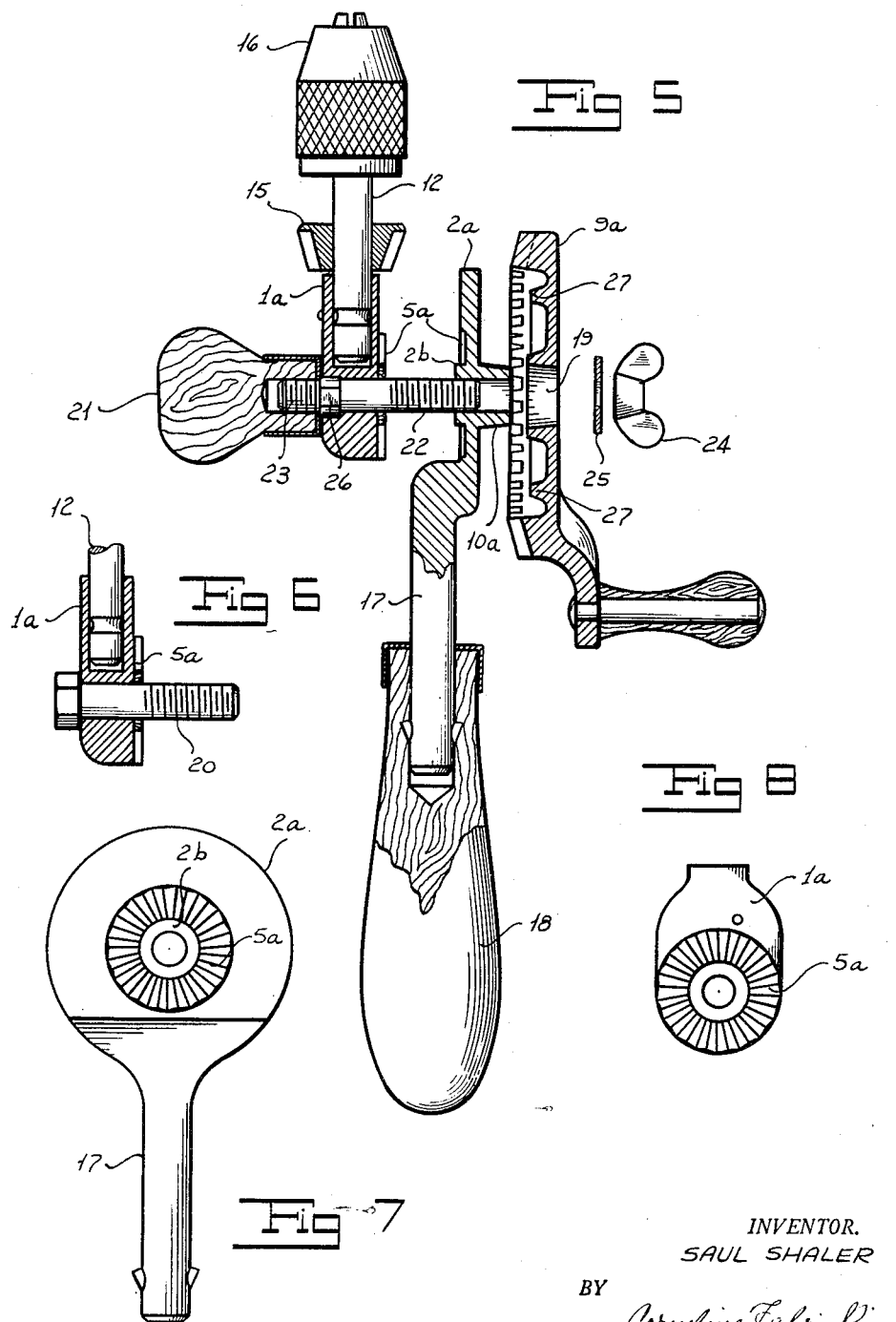

2,546,655

UNITED STATES PATENT OFFICE 2,546,655

ADJUSTABLE HAND-DRILL

Saul Shaler, Jackson Heights, N. Y.

Application August 6, 1947, Serial No. 766,664

2 Claims. (Cl. 77—7)

This invention relates to adjustable hand drills wherein the axis of the chuck spindle may be arranged at various angles of inclination with respect to the axis of the handle of the drill, at the will of the operator.

The object of the invention is to provide such a drill which will be extremely simple and economical to manufacture, thoroughly efficient in its operation and not apt to get out of order.

The tool of this invention embodies, fundamentally, two members or plates adapted to be placed in face abutting relation and clamped together by a stud bolt. The contacting faces of these plates are complementarily radially corrugated or serrated to interfit with one another and be locked together against relative rotation when the stud bolt is tightened. On one of these plates, the chuck spindle is mounted to rotate on an axis extending radially of said stud bolt and this chuck spindle carries a pinion which meshes with a driving gear rotatable on the stud bolt. The handle of the drill is fixed to a shank rigid with the other plate. When the stud bolt is loosened, the plates may be adjusted to shift the chuck spindle into desired angular relation to the handle of the tool and, if the bolt is then tightened, the parts will remain in these relative positions, while permitting the drive of the tool through a gear and pinion in the usual manner.

Features of the invention, other than those specified, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1 is a front elevation of a hand drill embodying the present invention, with certain parts broken away in the interests of clearness.

Figure 2 is a central section on the line 2—2 of Figure 1.

Figures 3 and 4 are face views of the contacting faces of the two plates, which permit the locking of the plates in the angular adjustment referred to.

Figure 5 is a view similar to Figure 2, but showing a modified form of the invention with the parts separated or spaced with respect to one another, so that the individual structures are more clearly apparent.

Figure 6 shows a further modified detail of the invention.

Figures 7 and 8 correspond to Figures 3 and 4, but show the structure illustrated in Figure 5.

Referring to the form of the invention shown in Figures 1-4 of the drawings, 1 and 2 designate two plates of any desired shape and configuration. They are provided with alined perforations 3 to receive a stud bolt 4 whereby they may be secured together in face contacting relation. The contiguous faces of these two plates are complementarily radially serrated, as indicated at 5, and these serrations on the two plates are adapted to interfit with one another, so that when the bolt is tightened to clamp them together, the plates are locked against angular movement about the axis of said bolt. The serrations on one of these plates may be conveniently formed on a boss to be received into a correspondingly formed depression in the face of the other plate.

The stud bolt 4 is shown as shouldered at 6 and the two plates are clamped to one another between this shoulder and a wing nut 7, as shown best in Figure 2. Beyond the shoulder 6, the stud bolt has an enlarged cylindrical bearing 8 for a driving gear 9 carrying an offset operating knob 10. The plate 1 is radially bored to form a cylindrical bearing 11, normal to the axis of bolt 4, for the inboard end of the chuck spindle 12 and this spindle is held in this bearing by a pin 13 driven through the plate and into an angular groove 14 formed in the spindle (see Figure 2). The spindle 12 also carries a pinion 15, rigid with and keyed to the spindle and meshing with the driving gear 9 and the outboard end of the spindle carries the usual chuck 16.

The other plate 2 has a shank 17, also radial of the bolt 4, and this shank is fitted into an appropriate handle 18 by which the tool is held while the knob 10 is rotated to drive the chuck spindle and operate the tool carried thereby.

Under normal conditions, the chuck spindle 12 will be in alinement with the handle shank 17, as shown in full lines in Figure 1 of the drawing, but if it is desired to change this relation, the wing nut 7 may be loosened, so as to permit the plate 1 to be swung around to bring the chuck spindle into, for example, the dotted line position of Figure 1, whereupon the tightening of the wing nut 7 will clamp the plates together, so as to maintain this relation and permit of the operation of the tool in this condition of adjustment.

The form of the invention shown in Figures 5, 7 and 8 is like in most respects to that shown in the preceding figures, but with the following differences. The serrations 5a on the part 1a, which correspond to the serrations 5 on the part 1, do not extend in an inward radial direction entirely therefrom to the opening for the stud 22, but are cut away to permit a boss 2b on the plate 2a to extend into the opening thus provided.

Also the driving wheel 9a, which corresponds to the wheel 9, does not have a bearing on the bolt or stud, but is mounted to rotate upon a slightly tapered boss 10a on the exterior face of said plate 2a, the hole 19 in said wheel being tapered to correspond with the tapering of the boss 10a. The boss is somewhat longer in an axial direction than the thickness of the wheel so that, when the stud is tightened, the wheel 9a may freely rotate.

The plates 1a and 2a may be clamped together and the wheel 9a held in position by an ordinary bolt 20 shown in Figure 6, adapted to receive a washer and wing nut. However, the structure of Figure 5 provides for a steadying knob 21. This knob may conveniently be mounted on the end of the stud 22 which projects beyond the outer face of the plate 1a and is threaded to receive said knob as shown at 23. That portion of the stud 22 which projects beyond the other face of the plate 1a is adapted to pass through the central opening in the bosses 2b and 10a and is threaded to receive a wing nut 24 to clamp a washer 25 against the outer end of the boss 10a to hold the driving gear 9a in position and all of the parts assembled and clamped together with the serrations in the adjacent faces of the plates in interfitting relation. To preclude inadvertent rotation of the stud 22, it may have one or more flat sides 26 interfitting with a correspondingly shaped recess in the plate 1a.

The driving wheel 9a of Figure 5 is preferably provided with an annular rib 27 on its inner face, so that, after long periods of use, when the parts may become worn, or in the event that the stud is not clamped tightly before using the hand drill, the annular rib may contact with the outer face of the plate 2a. This engagement will keep the wheel from wobbling as it is rotated and insure proper mesh between the teeth of the driving wheel and the pinion on the chuck spindle. It will be noted that the structures of Figures 1 and 2 also embodies an annular rib 27 adapted to function in like manner.

The tools which I have described have many advantages over adjustable hand drills heretofore used. Practically all parts are made by casting and the tolerances need not be very close. There is a minimum of boring, fitting or finishing necessary. My tools, therefore, adapt themselves very well to quantity production and are nevertheless good tools. When the relatively adjustable plates 1 and 2 or 1a and 2a are clamped together, their contacting surfaces engage one another across a broad expanse and thus have a very tight positive grip with one another so that there is no chance of slipping and injuring the hands of the operator or marring the work operated upon. This is in marked contrast with the spring actuated devices, pins, and other expedients heretofore employed in tools of this general character.

The foregoing detailed description sets forth the invention in its preferred practical form, but the invention is to be understood as fully commensurate with the appended claims.

Having thus fully described the invention, what I claim as new and desire to secure by Letters Patent is:

1. A hand drill comprising a chuck plate and a handle plate arranged in face contacting relation and having alined openings therethrough with the contacting faces of the plates complementarily serrated radially of said openings for interfitting relation, a handle plate provided at its exterior face with a circular boss coaxial of its opening and forming a bearing for a driving gear, a driving bevel gear journalled for rotation on said bearing, a stud extending through the openings in said plates, a nut screwed onto said stud beyond the end of the boss on the handle plate to normally maintain the serrations of the two plates in interfitting relation and simultaneously hold the driving gear on said boss, a chuck spindle journalled in the chuck plate for rotation on an axis perpendicular to the axis of the stud and carrying a bevel pinion meshing with the driving bevel gear, a chuck carried by the outboard end of the chuck spindle, a handle rigid with the handle plate and an offset operating knob carried by the driving gear, said driving gear being provided on its inner face with an annular rib closely spaced from the outer face of the handle plate and adapted to engage therewith to take the strain off of the bearing of the driving wheel.

2. A hand drill comprising a chuck plate and a handle plate bolted together in face contacting relation by a clamping stud, the contiguous faces of said plates being complementarily serrated radially of the axis of said stud for interfitting relation to lock the plates against relative rotation so long as they are tightly clamped together by the stud, a chuck spindle carried by the chuck plate and journalled for rotation therein on an axis perpendicular and radial to the axis of the stud, a chuck and a bevel pinion on the chuck spindle, a driving bevel gear meshing with the pinion and journalled for rotation on the stud, a shank extending from the handle plate, and a handle on said shank, said driving gear being provided on its inner face with an annular rib adapted to contact with the adjacent face of the handle plate to steady the operations of the gear when driving the pinion.

SAUL SHALER.

REFERENCES CITED

The following references are of record in the file of this patent:

UNITED STATES PATENTS

| Number | Name | Date |
|--------|------|------|
| 661,418 | McClellan | Nov. 6, 1900 |
| 684,722 | Rose | Oct. 15, 1901 |
| 809,822 | Lawton | Jan. 9, 1906 |
| 1,343,180 | Maddox | June 8, 1920 |
| 2,310,759 | Clawson | Feb. 9, 1943 |
| 2,340,707 | Staley | Feb. 1, 1944 |